March 27, 1951 O. BOONSHOFT 2,546,145
BOMB SIGHTING DEVICE
Filed Sept. 13, 1944 3 Sheets-Sheet 1
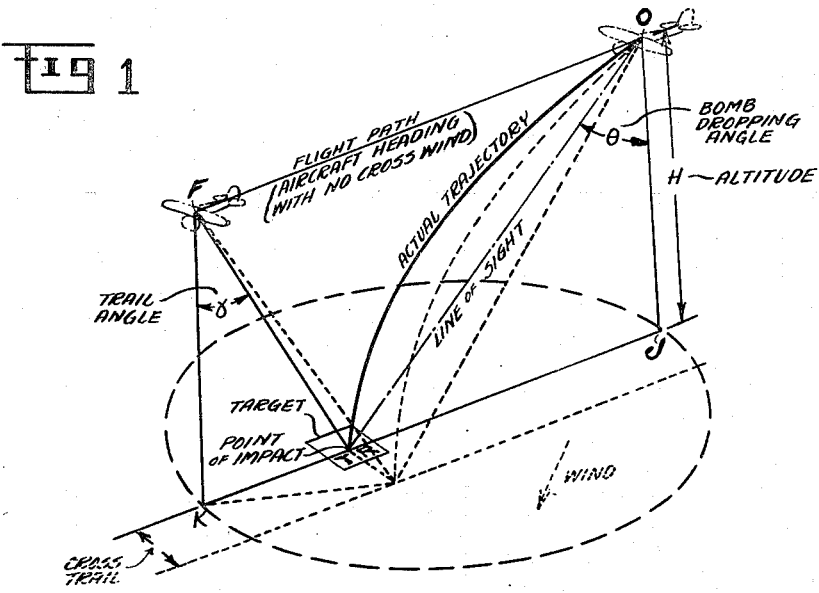
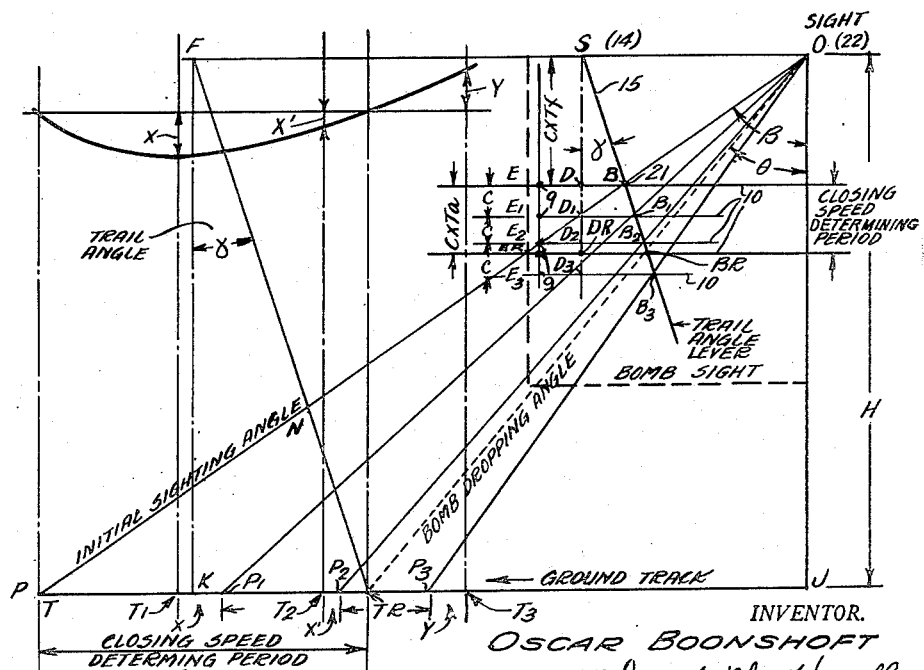
INVENTOR.
OSCAR BOONSHOFT

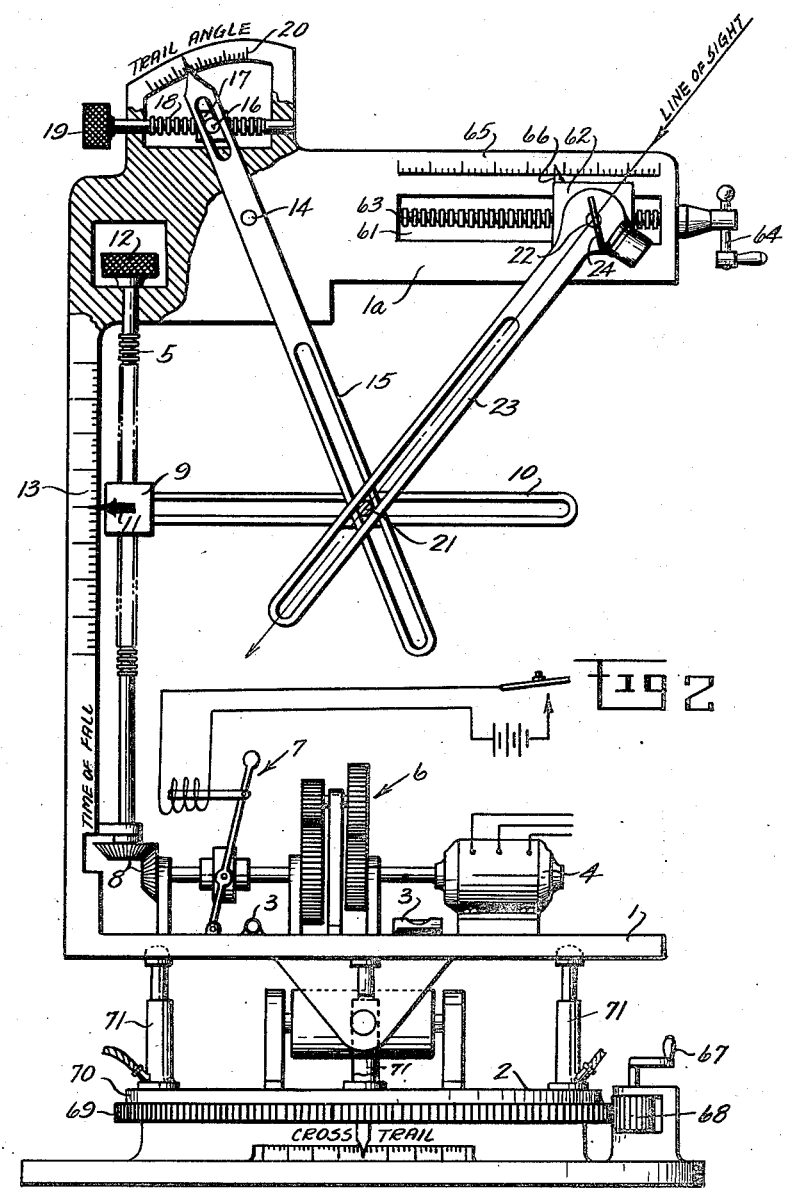

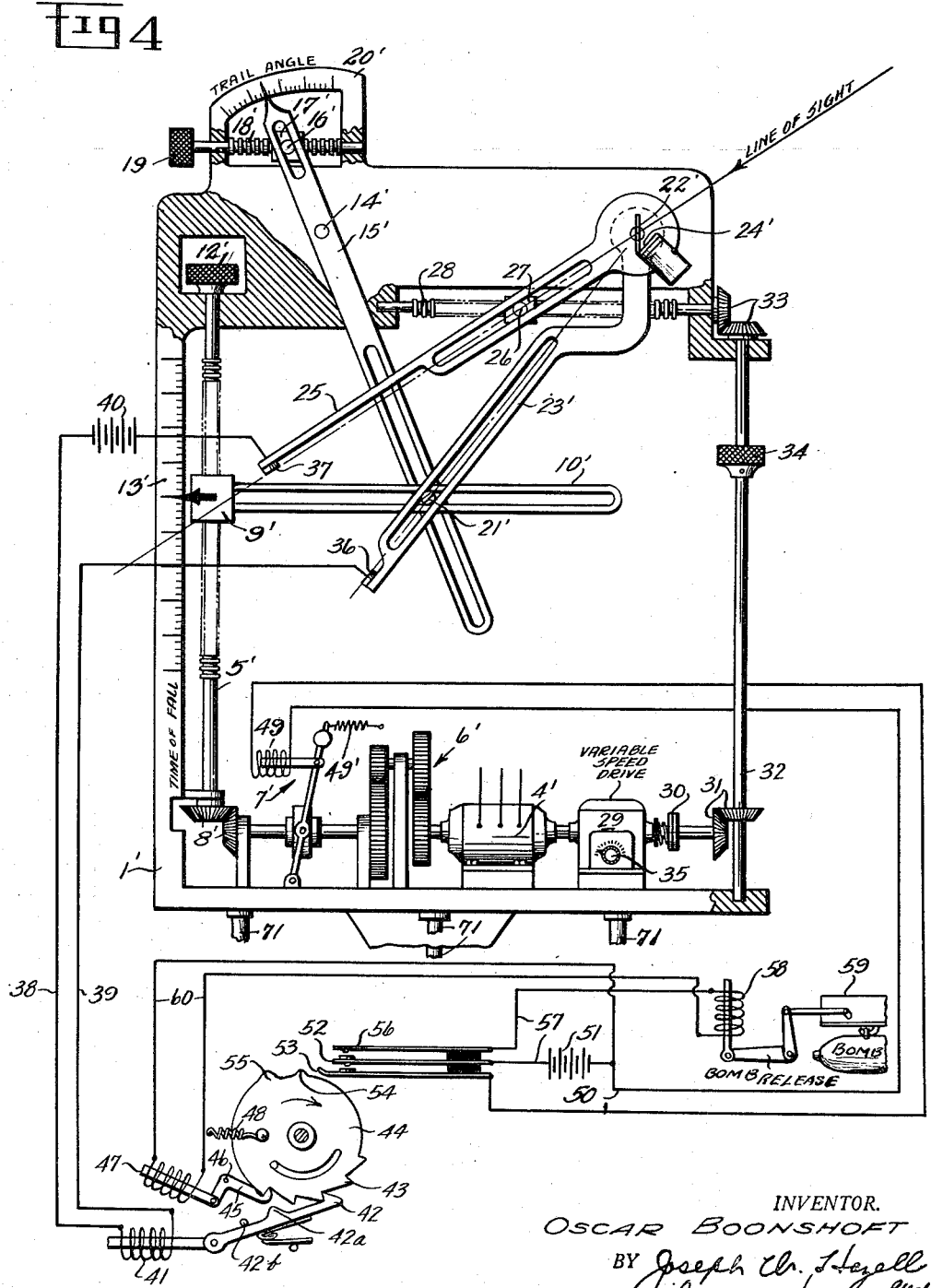

Patented Mar. 27, 1951

2,546,145

UNITED STATES PATENT OFFICE 2,546,145

BOMB SIGHTING DEVICE

Oscar Boonshoft, Dayton, Ohio

Application September 13, 1944, Serial No. 553,852

19 Claims. (Cl. 33—46.5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to bombing sights for aircraft, and more particularly to compensating bomb sights for calculating the closing speed between an aircraft and a selected target during a preliminary sighting period, and has for an object means for automatically adjusting the sight for variations between the air and ground speeds of the aircraft during its approach toward a selected target to determine the bomb release sighting angle for the bombs carried by the aircraft in order to dispose the impact point of the bombs in coincidence with the target at the time of impact.

Another object of the present invention is the provision of an adjustable bomb sighting means for bombardment aircraft for obtaining a preliminary sight on a selected target at the beginning of an initial or preliminary closing speed determining period during the approach of the aircraft toward the target at a uniform closing speed and predetermined elevation, including means for uniformly depressing the sighting angle of the sight during said closing speed determining period at a predetermined decelerating rate initially greater and subsequently less than the change in angular relation of a line between the target and the sight, and a vertical line to determine the correct bomb dropping position of the aircraft with respect to the target when the line of sight subsequently crosses the target at the end of the closing speed determining period.

A further object of the invention is the provision of an automatically operable compensating bomb sighting apparatus for bombardment aircraft for determining the closing speed and direction of movement of the aircraft toward a selected target and accurately determining the bomb dropping position of the aircraft, comprising shiftable sighting means and regulatable power means for uniformly moving said sighting means to maintain the line of sight on the target during a direct approach of the aircraft toward the target at a uniform speed and elevation, including closing speed determining means having power means for positive actuation thereof during the closing speed determining period to dispose the sighting means and the closing speed determining means in predetermined cooperative bomb dropping relation at the end of the closing speed determining period.

A further object of the invention is the provision of power driven adjustable sighting means for bombardment aircraft for maintaining a line of sight on a bombing target during a direct approach toward the target at a uniform speed and selected elevation, and closing speed determining means operable by said power driven sighting means for determining the closing speed between the target and the aircraft during an initial closing speed determining period immediately prior to the operation of bomb release means, and for automatically actuating said bomb release means at the termination of the closing speed determining period.

A still further object is the provision of an automatic bomb sight for obtaining a preliminary running sight on the target to determine the closing speed between the target and the aircraft carrying the sight, and means for subsequently automatically determining the dropping angle for said closing speed and effecting release of the bombs when the aircraft reaches the dropping angle.

Other objects and advantages of the invention will become apparent from the following description taken in connection with the accompanying drawings, in which like reference characters refer to like parts in the several figures.

Fig. 1 is a diagrammatic perspective view illustrating the trajectory of a bomb with respect to an aircraft from which it is released, the dotted lines illustrating variations in the impact point due to cross wind and drift conditions.

Fig. 2 illustrates the arrangement of operating mechanisms in a preferred form of bomb sighting device embodying my invention.

Fig. 3 is a diagrammatic illustration of the relationship between a target and lines of sight during a bombing run of an aircraft employing my improved bombing sight shown in Fig. 2.

Fig. 4 illustrates a modified arrangement of automatically operable mechanisms for adjusting the sight to cause the same to follow the target automatically during the preliminary closing speed determining period and the time when the line of sight reaches the correct bomb dropping angle, and for actuating the bomb release means when the sight reaches said bomb dropping angle.

Referring more particularly to Fig. 2 of the drawings, my improved bomb sight comprises a frame or support 1 mounted on a rotatable platform 2, capable of being leveled horizontally. Levels 3 are mounted on the frame 1 to indicate when the support or frame carrying the sight is in horizontal position.

On the frame 1 is mounted a constant speed motor 4 which rotates a vertically disposed screw spindle 5 through a gear train 6, a magnetic clutch 7 and a pair of beveled gears 8. A nut 9 is threaded onto the spindle 5 and locked against rotation. This nut 9 has fixed thereto a horizontal slotted "time of fall" indicating arm 10 having a pointer 11 projecting therefrom to register with a suitably calibrated "time of fall" scale 13. A knob 12, secured to the upper end of the spindle 5 provides manual setting means for vertically adjusting the nut 9 on the spindle 5 and the vertical position of the time of fall arm 10 while the clutch 7 is in disengaged position. The time of fall scale 13 for the pointer 11 is calibrated linearly in such a manner that the actual vertical distance of the time of fall ($Tf$) setting of the arm 10 below the pivot point 14 is equal to $C \times Tf$, in which C represents the value of a constant predetermined downward velocity of the nut 9 when the motor 4 is running with the clutch 7 engaged, and $Tf$ indicates the time of fall of a bomb from the time of its release from the aircraft to the time of its impact with the ground.

A slotted trail angle setting arm or lever 15 is pivotally mounted on the support at the pivot point 14, the angular relation of this arm with respect to the vertical is determined by the position of a stud 16 carried by a nut 17, locked against rotation, and threaded on a horizontal screw spindle 18. The spindle 18 is manually rotatable by a knob 19, fixed to the spindle, to change the trail angle adjustment of the trail angle lever 15. The upper extremity of the lever 15 carries a pointer cooperating with a trail angle ($\gamma$) scale 20, located on the upper portion of the frame 1 and calibrated in mils (6400 mils=360°), thereby providing a direct measurement to facilitate the adjustment of the trail angle of the lever 15 with respect to the vertical. A slidable operating connection or pin 21, located at the intersection of the slotted time of fall arm 10 and the trail angle lever 15 slidably connects the arm 10 and lever 15 together.

On the frame 1, horizontally across from the pivot 14, toward the rear of the aircraft, as indicated at pivot point 22, is disposed a slotted sighting angle and subsequent dropping angle determining lever 23 pivoted to the frame having a slotted extremity extending across the slotted portions of the trail angle lever 15 and the time of fall arm 10, interlocked in sliding engagement therewith by the pin connection 21 in such a manner that the line of sight of a sighting device, carried by the sighting lever, rotates about the center line of the pivot 22 and passes through the center line of the pin 21.

The operation of the device, when no cross wind is present, is as follows. The true airspeed and altitude of the aircraft above the target are determined in the usual manner, by reading the flight instruments in the plane and a previous knowledge of the elevation of the target which must also be taken into consideration. The values of the time of fall ($Tf$) and trail angle ($\gamma$) of the particular bomb to be released are set by adjusting the knobs 12 and 19, respectively, in conjunction with the time of fall ($Tf$) scale 13 and the trail angle ($\gamma$) scale 20, these values having been obtained from predetermined standard Ordnance Bombing Tables for the above determined airspeed and altitude above the target. The initial sighting angle ($\beta$), in Fig. 3, can be determined by completing the above steps.

The constant predetermined speed motor 4 is put into operation with the magnetic clutch 7 disengaged, and by means of an azimuth control system, forming no part of this invention, the correct ground track is determined, and the aircraft is directed along this course toward a selected target at uniform airspeed and predetermined elevation. Since the line of sight is directed toward the target, the target will, at some time, cross the line of sight. When the line of sight comes into coincidence with the target at the above initial sighting angle ($\beta$), as illustrated in Fig. 3, the initial timing or closing speed determining period begins as the clutch 7 in Fig. 2 is engaged by means of the switch controlled circuit disclosed in the drawing, causing the line of sight to rotate about the pivot pin 22, and the line of sight will be initially depressed and will deviate from the target, as viewed through the sighting device 24. During a closing speed determining period of time, due to the subsequent slower or decelerating movement of the sight and sighting lever 23, the line of sight and target will gradually approach each other again, and cross each other at a correct bomb dropping angle ($\theta$). The bomb or other object to be dropped must be released at this instant. The clutch 7 is then preferably disengaged and the motor 4 stopped.

The following is an analysis of the device illustrated in Fig. 2, and also proof that the dropping angle ($\theta$), as determined by the second coincidence of the line of sight with the target, is the correct bomb dropping angle, regardless of variations between ground and air speeds of the aircraft. With respect to Fig. 3, Point S represents pivot 14 in Figs. 2 and 4,
Point O represents the pivot 22,
Point B represents the slidable connection or pin 21,
Point E represents the time of fall ($Tf$) nut 9,
Angle $\gamma$=trail angle,
Angle $\beta$=initial sighting angle,
Angle $\theta$=dropping angle.

With the time of fall arm 10 positioned at EB (Fig. 3) so that SD equals $C \times Tf$, and arm 15 positioned at $\gamma$ with respect to the vertical, the pin 21 is located at B. This determines the initial sighting angle $\beta$.

The aircraft is flown along the correct ground track with the motor 4 running and the clutch 7 is engaged when the line of sight OP at the initial sighting angle $\beta$ comes into coincidence with the target T, thereby causing the nut E of the arm 10 to be driven downwardly at a constant velocity C. The nut E will be subsequently located at points E1, E2, E3, etc. at the end of each succeeding interval of time (for instance, at one second intervals) after coincidence of the line of sight with the target at the initial sighting angle $\beta$.

Since the position of the trail angle lever 15 is set and maintained at the trail angle $\gamma$, the pin B will be driven down the lever 15 at a constant velocity (which is not equal to C) and, therefore, the pin B will be located at points B1, B2, B3, etc. at the end of each of the above succeeding intervals of time. Since the line of sight OP is forced to follow the pin 21, the intersection of the line of sight with the ground P will occur at points P1, P2, P3, etc. at the end of each succeeding time interval, and the target T will be at points T1, T2, T3, etc. with respect to the bombsight or aircraft at the end of the above succeeding time intervals.

The distance X is the difference between the intersection of the line of sight with the ground at P1 and the target T1 at the end of the first interval of time, and X', at the end of the second interval of time. The distance Y is the difference at the end of the third interval of time. By plotting the difference at the end of each interval of time after the first coincidence of the line of sight with the target at the initial sighting angle β, the curve shown in the upper portion of Fig. 3 results. This curve illustrates the relationships between the target and the intersection of the line of sight with the ground during the bombing run.

During the downward travel of the arm 10, the line of sight is depressed throughout the first two intervals C, C to the extent indicated in Fig. 3 by the distance X, or from T1 to P1 during the first interval, and by the distance X', or from T2 to P2 during the second interval. During the third interval C, the line of sight and the target coincide at some point TR, which determines the dropping angle θ, at which instant the bombs should be released.

Proof that the angle θ, determined by the second coincidence of the line of sight with the target, is the correct bomb dropping angle follows.

With reference to Fig. 3, the nut 9 is located at E, the pin 21 at B, and the target and line of sight located at T at the angle β. Lines FK and FTR are added to facilitate the proof. As previously specified, it is one of the essential basic characteristics of this invention that the nut E (9) is initially set at a distance of $C \times Tf$ below the pivot S (14), therefore, $SD = C \times Tf$.

During the time of the bombing run or closing speed determining period, from the initial sighting angle β to the dropping angle θ ($Ta$ being used to represent this length of time), the nut 9 at E traveled to ER with a velocity C, therefore, $DDR = C \times Ta$. During the time of the bombing run $Ta$, the target traveled from T to TR with respect to the device at the relative range velocity or closing speed V, therefore, $TTR = V \times Ta$.

Summarizing the above three (3) basic relationships, $SD = C \times Tf$, $DDR = C \times Ta$, and $TTR = V \times Ta$. Since DB is parallel to DRBR, $SD:SB::DDR:BBR$.

Since line FTR was drawn parallel to line SBR, $FN:SB::NTR:BBR$. Therefore, $$FN = K \times SD = K(C \times Tf)$$

and $NTR = K \times DDR = K(C \times Ta)$ where K is a constant.

In similar triangles PNTR and ONF, $$PTR:NTR::FO:FN$$

$$FO = \frac{PTR \times FN}{NTR} =$$

$$\frac{(V \times Ta) \times K(C \times Tf)}{K(C \times Ta)} = V \times Tf = KJ$$

In triangle FKTR, $KTR = FK$ tangent $\gamma = H$ tangent $\gamma$.

$$TRJ = KJ - KTR = (V \times Tf) - H \text{ tangent } \gamma$$

$$\text{Tangent } \theta = \frac{TRJ}{OJ}$$

Therefore:

$$\text{Tangent } \theta = \frac{(V \times TF) - H \text{ tangent } \gamma}{H}$$

which is the fundamental equation for dropping angle θ.

Since the present bombardment aircraft are capable of speeds in excess of 300 M. P. H., a slight error in determining the instant at which the line of sight comes into coincidence with a selected target at the initial sighting angle β or at the dropping angle θ, or delay in the operation of the bomb releasing mechanism at the second coincidence of the line of sight and target will cause excessive bombing errors.

To increase the accuracy of a device employing the embodiments of my invention, reference is made to the modified disclosure illustrated in Fig. 4, which provides for automatically disposing the line of sight as determined by the position of the initial sighting angle lever on the target at the respective preliminary sighting and subsequent dropping angles β and θ. In this form of the invention, the reflex or collimator type of sight preferably employed, as indicated at 24', rigidly mounted on a slotted target sighting arm 25 which arm is adjustably positioned around its pivot 22' on the frame 1' by a stud 26 projecting from a nut 27, locked against rotation and threaded on a horizontally disposed screw spindle 28. The motor 4' rotates the threaded spindle 28 through a variable speed drive device 29 of conventional form, and a spring loaded friction slip clutch 30 is preferably disposed between the variable speed drive 29 and the screw spindle 28. The drive connection between the variable speed drive 29 and the threaded spindle 28 includes a vertical shaft 32 and two pairs of beveled gears 31 and 33. A setting knob 34 is fixed to the shaft 32, thereby providing a manual means for controlling the rotation of the spindle 28 and initial positioning sighting alignment of the target sighting arm 25 carrying the sighting device 24. The variable speed control drive 29 is provided with an adjustable control knob 35 for adjusting the speed of rotation of the spindle 28 so that the line of sight may be synchronized with the relative movement of the target at all altitudes and closing velocities presently encountered to cause the line of sight to be maintained on the target during a uniform approach at a uniform elevation toward the target.

Fixed on the free ends of the sighting arm 25 and the initial sighting angle and subsequent dropping angle determining lever 23' which is similar to the initial sighting angle determining lever 23 in Fig. 2 are located cooperating electrical circuit closing contacts 36 and 37. These contacts are disposed in such a manner that closing of the contacts occurs exactly when the line of sight is in alignment with the center line of the slidable interlocking connection or pin 21'. The contact elements 36 and 37 control an energizing circuit 38—39 having a battery 40, and include a solenoid device 41 for operating a ratchet pawl 42 a limited distance once each time the contact members 36 and 37 are brought into contacting engagement with each other, causing the solenoid 41 to be energized and the ratchet pawl 42 to engage one of the teeth 43 of a controlling circuit cam 44 and rotate the cam in a clockwise direction.

A holding pawl 45 engages the teeth 43, preventing return movement of the camming disc 44 when the ratchet pawl moves forward to engage the next tooth 43. The holding pawl 45 is of bell crank formation pivoted at 46 on a suitable part of the supporting frame, and includes means for moving the pawl out of engagement with the camming disc 44, following the second increment of movement of the cam disc by the ratchet pawl 42. The ratchet pawl 42 is provided with a cam portion 42a projecting from one edge, disposed to engage a fixed pin 42b to move the pawl out of engagement with the teeth 43 at the final actuating movement of the pawl by the solenoid 41 so that, when the release solenoid 47 is energized to withdraw the holding pawl 45, the return spring 46 is free to return the camming disc 44 to the position shown in Fig. 4 of the drawing.

The magnetic friction clutch 7' is provided having a clutch engaging solenoid 49, connected by the electrical circuit connections 50 and battery 51, to the normally spaced circuit closing contact blades 52 and 53 disposed in the path of movement of the "low" cam 54 extending from the periphery of the camming disc 44. Initial contact between the contact members 36 and 37, carried by the sighting arm 25 and the initial sighting angle determining lever 23' closes the circuit 38—39 and energizes the solenoid 41, causing the camming disc 44 to be rotated one increment of movement in the direction of the arrow, raising the contact blade 53 just enough to engage the adjacent contact blade 52. The closing of contacts 52—53 closes the electrical circuit 50, energizing the solenoid 49, which initiates the operation of the time of fall actuating arm 10' by the constant speed motor 4'. Since the pin 26 moves the sighting arm 25 downwardly at a uniformly accelerating rate during the movement of the sight and support for the bomb sight toward the target at a uniform rate and elevation, and the time of fall arm 10' moves the sighting angle determining lever 23' upon engagement of the magnetic clutch 7' at a uniformly decelerating rate which is initially greater than the rate of movement of the sighting arm 25, the initial sighting angle determining lever 23' will initially separate from the sighting arm 25 at the beginning of the closing speed determining period, but the sighting arm 25 will subsequently overtake the sighting angle determining lever 23' at the termination of the closing speed determining period and the contacts 36 and 37 will again be closed, causing the circuit 38—39 to be again energized. This will occur when the line of sight of the sighting arm 25 is disposed in alignment with the target TR at the bomb dropping angle θ as determined by the bomb dropping angle position of the lever 23'. The solenoid 41 will be again energized and the camming disc 44 rotated to cause the "higher" circuit closing cam 55 to engage the contact blade 53, flexing the central contact blade 52 upwardly into engagement with the upper contact blade 56, closing an electrical circuit 57 which includes the solenoid 58 for operating the bomb release mechanism 59, and the solenoid 47 in a circuit 60 in series with the solenoid 58. This operation occurs when the sighting arm 25 and the sighting angle determining lever 23' are at the bomb dropping angle θ, as determined by the contacting engagement between the contact 37 on the moving sighting arm 25, and the contact 36 on the contact lever 23' which is actuated by the time of fall arm 10', its initial sighting angle position or initial timing or closing speed determining period being modified by the angular adjustment of the trail angle lever 15'.

When the solenoid 41 is energized to draw the ratchet pawl to the left at the second coincidence of contacts 36 and 37 to rotate the camming disc 44, this effects closing of the circuit to the bomb release mechanism and to the solenoid 47 for the release latch 45. The ratchet pawl 42 is held out of the path of the teeth 43 during its final actuation by reason of the closed position of the contacts 36 and 37 and engagement of its cam shaped edge portion 42a with the pin 42b so that the disc 44 is free to instantly be returned by a return spring 48 when the bell crank latch 45 is moved to disengaging position incident to the engaging of the circuits 57 and 60 and before the latch 45 has time to drop back to its holding position. This operation separates the contact blades 52, 53 and 56, permitting the magnetic clutch 7' to be disengaged by the spring 49', and the movement of the time of fall arm 10' to be arrested.

With the apparatus as shown in Fig. 4, a preliminary running sight may be made on a selected target at any time that the target is visible, prior to the time when the plane reaches an initial target sighting angle position at the beginning of the actual closing speed determining period as determined by the angular position of the sighting angle determining lever 23'. So long as the bombing plane is maintained on its course at a uniform speed and fixed elevation, and the variable speed drive 29 is adjusted by manipulation of the knob 35 to maintain the line of sight on a target during the interval of time that the target is visible, so that the line of sight is accurately following the target, it is immaterial whether the target is obscured by clouds or not during the actual closing speed determining period and bomb dropping interval. At the beginning of the closing speed determining period, the contacts 36 and 37 on the sighting arm and sighting angle determining levers will engage, moving the camming disc 44 one increment of movement, engaging the magnetic clutch 7'. At the end of the closing speed determining period, the contacts 36—37 engage again for the second time, and the camming disc 44 is given a second increment of movement, releasing the bombs automatically, disengaging the clutch 7', and returning the camming disc 44 to its initial position.

In the event of drift, the sight must be adjusted to take care of cross trail or drift angles in the usual manner, as shown in dotted lines in Fig. 1, but since these adjustments are conventional, no explanation relating to these adjustments is thought to be necessary.

Referring again to Fig. 2, the distance between the pivot 14 for the trail angle lever 15 and the pivot 22 for the sighting angle determining lever 23 is not material to the operation of the device since variations in this distance only change the length of the closing speed determining period. Provision is made in Fig. 2 for adjustment of the closing speed determining period by moving the pivot 24 with respect to the pivot 14. The horizontally disposed supporting portion 1a of the supporting frame 1 is slotted, as indicated at 61, to slidably receive a guide block 62 carrying the pivot 22 for the sighting angle determining lever 23. A threaded spindle 63 extends through the slotted portion 61 in threaded engagement with the guide block 62, and is rotatably carried in the horizontally disposed frame portion 1a. The spindle 63 carries an operating crank 64, rotation of which adjusts the guide block 62 horizontally to position the pivot 22 toward or away from the pivot 14 for the trail angle lever 15. A scale 65 may be provided for registration with a pointer 66 carried by the guide block 62 to determine the relative setting of the guide block in the opening 61 and the variations in the length of the closing speed determining period and in the initial sighting angle β due to the change in distance between the pivots 14 and 22.

The platform or support 1 may be adjusted for cross trail by operating a crank 67 carrying a gear 68, meshing with a gear 69 carried by the rotatable base 70. Any suitable leveling means for the support 1 may be provided, such as hydraulic pistons and cylinders 71 suitably controlled, either automatically or manually in any desirable manner, it being essential that the support 1 be maintained horizontal at all times, particularly during the sighting and bomb dropping intervals.

Having thus described my invention, I claim:

1. In a bomb sight for aircraft, a support, a sighting member movably carried by said support for sighting alignment with an approaching selected target, adjustable driving means for uniformly moving said sighting member to maintain the line of sight fixed on the target during said approach thereto when said support is moving directly toward the target at a uniform rate and elevation, closing speed period determining means comprising a second member adjustably mounted on the support for engagement with said sighting member, means for adjusting said second member with respect to said sighting member to predetermined positions on said support for predetermined altitudes of said support, second member moving means for moving said second member on said support in the direction of movement of the sighting member at a predetermined initially greater rate subsequently decelerating to less than the rate of movement of said sighting member to first cause movement of said members away from each other and then toward each other, means operable upon predetermined relative movement of said sighting member toward said second member for initiating the operation of said second member moving means, and bomb release means operable upon subsequent predetermined relative movement of said sighting member toward said second member.

2. In a bomb sight for aircraft, a support, a sighting member movably carried by said support for sighting alignment with an approaching target, adjustable driving means for uniformly moving said sighting member to maintain the line of sight fixed on the target during said approach thereto when said support is moving directly toward the target at a uniform rate and elevation, a second member adjustably mounted on the support for contacting engagement with said sighting member, means for adjusting said second member with respect to said sighting member to a predetermined position on said support for a predetermined altitude of said support above the target, second member moving means for moving said second member uniformly on said support in the direction of movement of the sighting member at a predetermined initially greater rate decelerating to less than the rate of movement of said sighting member to first cause movement of said members away from each other and then toward each other, means operable upon predetermined relative movement of said sighting member toward said second member for initiating the operation of said second member moving means, bomb release means operable upon subsequent predetermined relative movement of said sighting member toward said second member, and adjustable trail angle control means comprising an adjustable member shiftably connecting said second adjustable member to said second member moving means for varying the initial engaging position of said second member with respect to the said sighting member to compensate for variations in trail angle between the point of impact of a bomb released from the aircraft by operation of said sighting member and the position of the aircraft at the time of the impact of said bomb.

3. In a bomb sight, a support adapted to be advanced horizontally toward a target at a uniform rate and predetermined elevation, having horizontally spaced pivot points disposed longitudinally in the direction of travel of the support toward the target, a target sighting angle determining lever pivoted to the support at the rear pivot point to swing in a vertical plane passing through the selected target to be bombed, a trail angle setting lever pivoted on the support at the other pivot point to swing in a plane parallel to the plane of movement of said sighting angle determining lever, said sighting and trail angle levers extending downwardly toward each other in overlapping relation, adjusting means for fixedly adjusting said trail angle lever for predetermined trail angles between the impact point of a bomb when released from the support and the support at the time of impact, a vertically movable horizontally disposed time of fall determining arm movably carried by said support, extending across the said sighting angle determining and trail angle levers below said pivot points in overlapping relation to said levers, means for slidably interlocking said levers and said arm together, means for adjustably disposing said time of fall arm at a predetermined position below said pivot points to adjust the angle of said sighting angle determining lever to a predetermined initial sighting angle position for predetermined elevations of said support above the target, power means for moving said time of fall arm uniformly downward at a predetermined rate to dispose the sighting angle determining lever in subsequent bomb dropping angle determining sighting position at a predetermined subsequent period when said sighting angle determining lever and target are in predetermined sighting alignment, and clutch means for initiating the downward movement of said time of fall arm by said power means.

4. In a bomb sight, a support adapted to be advanced horizontally toward a target at a uniform rate and predetermined elevation, having horizontally spaced pivot points disposed longitudinally in the direction of travel of the support toward the target, a target sighting angle determining lever pivoted to the support at the rear pivot point to swing in a vertical plane passing through the selected target to be bombed, a trail angle setting lever pivoted on the support at the other pivot point to swing in a plane parallel to the plane of movement of said sighting angle determining lever, said sighting angle determining and trail angle levers extending downwardly toward each other in overlapping relation, adjusting means for fixedly adjusting said trail angle lever for predetermined trail angles between the impact point of a bomb when released from the support and the support at the time of impact, a vertically movable horizontally disposed time of fall determining arm movably carried by said support, extending across the said sighting angle determining and trail angle levers below said pivot points in overlapping relation to said levers, means for slidably interlocking said levers and said arm together, means for adjustably disposing said time of fall arm at a predetermined position below said pivot points to adjust said sighting angle determining lever to a predetermined initial sighting angle position for predetermined elevations of said support above the target, power means for moving said time of fall arm uniformly downward at a predetermined rate to dispose the sighting angle determining lever in subsequent bomb dropping angle sighting position at a predetermined subsequent period when said sighting angle determining lever and target are in predetermined sighting alignment, clutch means for initiating the downward movement of said time of fall arm by said power means, and bomb release means operable when said sighting angle determining lever is in said last mentioned position.

5. In a bomb sight for aircraft, a support, an initial sight angle determining lever pivotally carried on said support, a bombing sight movable in a vertical plane with said sighting angle determining lever, a manually adjustable trail angle setting lever pivoted to said support in spaced relation to said sighting angle determining lever pivot, to swing in adjacent parallel overlapping relation to said sighting angle determining lever, a time of fall computing arm bodily movable on said support in overlapping relation to said trail angle lever and said sighting angle determining lever in parallel relation to a line between said lever pivots, means for slidably interconnecting said levers and arm together, power means for moving said time of fall arm uniformly away from said lever pivots at a predetermined rate, clutch means for initiating the movement of said time of fall arm moving means, manual means for adjusting the position of said time of fall arm to adjust the initial sighting angle position of said sighting angle determining lever to position said bombing sight at a predetermined preliminary sighting angle to determine the time of actuation of the clutch means for initiating the movement of said time of fall arm by said power means.

6. In a bomb sight for aircraft, a support adapted to be mounted on the aircraft, a sighting member movably carried on the support for initial sighting alignment with a selected target, means for moving said sighting member at a uniformly accelerating rate to maintain the same in sighting alignment with the selected target when the support is moved toward the target at a uniform speed and predetermined elevation, an initial sighting angle determining contact member movably disposed on the support in the path of movement of said sighting member to be initially contacted thereby, means for adjusting the initial contacting position of said contact member with respect to said sighting member to establish a contacting relation when said sighting member is disposed in a preliminary predetermined sighting position for predetermined speeds and elevations of the support, means for moving said contact member uniformly at a predetermined initially greater and subsequently lower rate of movement with respect to the movement of said sighting member to cause said sighting member to overtake and again contact said contact member when the sighting member has moved to bomb dropping position, means operable incident to said initial contacting relation between said sighting means and said contact member for initiating the operation of said contact member moving means, and means operable incident to said second contacting relation between said sighting means and said contact means to determine said bomb dropping position of the sighting means.

7. In a bomb sight for aircraft, a support, a sighting member movably carried on said support, means for adjusting said sighting member into sighting alignment with a selected target, adjustable means for moving said sighting member on said support at a uniformly accelerating rate to maintain the same in sighting alignment with the target when said support is moved toward said target at a uniform speed and elevation, a contact member movably disposed on said support in the path of movement of said sighting member to be contacted thereby, means for adjusting the initial contacting position of said contact member with said sighting member to establish an initial contacting relation therewith when said sighting member is in a predetermined preliminary sighting position, means for moving said contact member away from said initial contacting position during a closing speed determining period between the support and target, at a predetermined uniformly decelerating rate, initially greater than the rate of movement of said sighting member when disposed at the initial contacting position, means operable by initial contact between said sighting member and said contact member at said initial contacting position for initiating the operation of said contact member moving means, and bomb release means operable by subsequent contact between said sighting member and said contact member when said sighting member again overtakes and contacts said contact member.

8. In a bomb sight for aircraft, a support adapted to be mounted on an aircraft, a sighting member movably carried on the support, adjustable power means for moving said sighting member at a uniformly accelerated rate to maintain the same in sighting alignment with a selected target when the support is moved toward said target at a uniform rate and predetermined elevation, a second adjustable member movably disposed on the support in the path of movement of said sighting member, to be contacted thereby, means for adjusting said second member with respect to said sighting member to adjust the initial contacting position between said members for predetermined speed and elevation of the support above the target, second member moving power means for uniformly moving said second member in advance of said sighting member to a second predetermined contacting position for contact with said sighting member, at a predetermined ratio to the closing speed between the target and support when said sighting member is disposed in bomb release sighting position, means for automatically initiating the operation of the second member moving power means when said sighting member engages said second member in said initial contacting position, bomb release means, and means for automatically initiating the operation of said bomb release means when said sighting member contacts said second member in said bomb release sighting position.

9. In a bomb sight for aircraft, a support adapted to be mounted on an aircraft, a sighting member movably carried on the support, adjustable power means for moving said sighting member at a uniformly accelerated rate to maintain the same in sighting alignment with a selected target when the support is moved toward the target at a uniform rate and predetermined elevation, a second adjustable member movably disposed on the support in the path of movement of said sighting member to be contacted thereby, means for adjusting the initial position of said second member for a predetermined elevation of the support to adjust the initial contacting position between said members when the sighting member has moved to a predetermined preliminary sighting position, second member moving power means for moving said second member in advance of said sighting member at a relatively decelerating rate to a second predetermined contacting position for contact with said sighting member when said sighting member has moved to bomb release sighting position, means for automatically initiating the operation of the second member moving power means by said initial contacting engagement between said sighting member and said second member when said sighting member is in said preliminary sighting position, bomb release means, means for automatically initiating the operation of said bomb release means when said sighting member subsequently contacts said second member in said bomb release sighting position, and a fixedly adjustable trail angle setting member connected between said power means and said second adjustable member for varying the predetermined contacting positions of said second and sighting members to compensate for variation in trail angle between the impact point of a bomb released by said bomb release means and the position of the support at the time of impact of the bomb.

10. In a compensating bomb sight of the class described, a support, angularly adjustable sighting means thereon, adjustable power means for uniformly moving said sighting means to maintain the line of sight on a target when the support is moving directly toward said target at a uniform speed and predetermined elevation, adjustable electrical contact means engageable by said sighting means, means for adjusting the contacting position of said contact means with respect to said sighting means so that the sighting means reaches a predetermined preliminary sighting position when the same contacts said electrical contact means, electrically controlled power means operable by said contact between said electrical contact means and said sighting means for moving said adjustable electrical contact means out of contacting position with said sighting means to dispose said contact means in a second contacting position relative to said sighting means at the termination of a predetermined time measuring period when said sighting means is moved by said first mentioned power means to bomb release sighting position, trail angle compensating means between said support and said contact means for variably adjusting the position of said contact means in predetermined ratio to trail angle between the support and the bomb at its time of impact, and electrically operable bomb release initiating means including an electrical circuit operable by said contact means when said sighting means and said contact means move into the second mentioned contacting engagement, with said sighting means in bomb release sighting position at the termination of said time measuring period.

11. In a bomb sight, a support, an adjustable electrical contact member, means for moving said contact member at a uniformly decelerating rate around a relatively fixed center, means for adjustably positioning said contact member to an initial predetermined contacting position, a second contact member movable about said center and a bomb sight movable thereby, means for moving said second contact member into contacting relation with said first contact member at a uniformly accelerating rate, said rate being initially less and subsequently greater than the rate of movement of said first contact member, electrically operable means including an energizing circuit to be closed by initial contacting engagement of said contact members for initiating the operation of said first mentioned contact member moving means, bomb release means including a second energizing circuit, and means operable by secondary contacting engagement between said contact members to energize said second energizing circuit to move said bomb release means to release position.

12. In a bomb sight, a support, a sighting lever pivoted at one end to said support having a slotted actuating portion, a bombing sight actuated by movement of said lever, a trail angle lever pivoted to said support in spaced pivotal relation to said sighting lever pivot, having a slotted actuating portion disposed in overlapping relation with the slotted actuating portion of said sighting lever, means for adjusting the angular relation of the trail angle lever on the support relative to a plane passing through centers of said lever pivots at right angles to the longitudinal axes of said pivots, a bodily movable time of fall arm having a slotted end portion extending across said overlapping slotted lever portions movable in parallel relation to a plane passing through the centers of said sighting and trail angle lever pivots, means for slidably interconnecting said slotted trail angle and sighting lever and time of fall arm portions together, means for adjusting said time of fall arm to position said sighting lever in a predetermined preliminary target sighting position under control of said trail angle lever, manually releasable actuating means for moving said time of fall arm away from said lever pivots at a predetermined uniform rate, to move said sighting lever at a uniformly decelerating rate during a predetermined closing speed determining time period between the support and the selected target after initially sighting the target through the bombing sight at the beginning of the closing speed determining period when the support is moved toward the target at a uniform speed and predetermined elevation, to advance the line of sight ahead of the target during initial movement thereof at the beginning of the closing speed determining period and subsequently move the line of sight across the target again when the target is in bomb release sighting position at the end of said closing speed determining period depending upon the relative closing speed between the support and the target.

13. In a bomb sight of the class described, a support adapted to be moved uniformly toward a selected target at a predetermined altitude, a slotted sighting lever pivoted on said support, sighting means adjustable thereby in a vertical plane passing through the target, adjustable power operated driving means for uniformly moving said sighting lever to maintain the line of sight on said target throughout an approach toward said target at a uniform speed and predetermined altitude, a contact lever pivotally mounted on said support concentric to said sighting lever having a slotted extremity and electrical circuit controlling contact means disposed in the path of movement of said sighting lever, an adjustable trail angle setting lever pivoted to said support in spaced relation to said concentric sighting and contact lever pivot to swing in a plane parallel to the plane of movement of contact and sighting levers, said trail angle lever having a slotted extremity overlapping the slotted extremity of said contact lever, means for adjusting the angular relation of said trail angle lever with respect to a plane passing through the center of said trail angle lever pivot and said contact lever pivot, a time of fall arm having a horizontally slotted extremity overlapping the slotted extremities of the trail angle and contact levers, means for adjusting the initial position of said slotted arm in parallel relation to said plane, power means for moving said time of fall arm uniformly away from said plane, common connecting means extending into the slotted extremities of said time of fall arm, the contact lever and the trail angle lever to adjust said contact means for preliminary contacting engagement with said sighting lever when the same is moved to a predetermined preliminary sighting position, means for moving said contact lever in advance of said sighting lever at a uniformly relatively decelerating rate to dispose said contact means in a subsequent predetermined contacting position to be engaged by said sighting lever when said sighting lever has moved to a predetermined bomb release position, means operable by said contact means during said preliminary contacting engagement with said sighting lever for initiating the operation of said time of fall arm moving means, bomb release means, and means operable by said contact means incident to said second contacting engagement thereof by said sighting lever for causing release operation of said bomb release means.

14. In a closing speed computing bomb sight, a support adapted to be moved toward a selected target at a uniform speed and predetermined elevation, target sighting means rotatably mounted on said support to swing in a vertical plane passing through the target during an approach thereto, adjustable power means for moving said sighting means during uniform movement of the support directly toward the target at a predetermined elevation to maintain the line of sight on said target, adjustable time of fall determining means including a circuit closing contact means adjustably disposed in the path of movement of said sighting means for initial contact therewith, means for adjusting the contacting position of said circuit closing contact means with respect to said sighting means for variations in predetermined altitudes of the sight above the target, adjustable trail angle setting means for varying the initial relative contacting position of said circuit closing contact means for variations in trail angles between the support and the impact point of a bomb dropped from the support at the time of impact, means operable by initial contact between the sighting lever and the circuit closing contact means for moving said circuit closing contact means in advance of the sighting means at an initially greater predetermined uniformly decelerating rate during a predetermined closing speed determining period between the target and support which is terminated by contacting engagement between the sighting means and said circuit closing contact means, including electrically operable means for initiating the movement of said circuit closing contact means with respect to said sighting means upon the initial contacting engagement of said sighting means therewith, and bomb release means operable by subsequent contact between said sighting means and said circuit closing contact means at the end of said closing speed determining period.

15. In a bomb sight, a support adapted to be advanced toward a selected target at a uniform speed and predetermined elevation, a sighting lever pivoted on said support, adjustable power means for swinging said lever at a uniformly accelerating rate to maintain a line of sight on the target during a predetermined closing speed determining period during said approach toward the target, a time of fall computing lever pivotally adjustable on the support, means for adjusting the position of said time of fall computing lever in a predetermined ratio to the elevation of said support above the target, trail angle setting means for varying the adjustment of said time of fall computing lever in predetermined ratio to variations in trail angle between the point of impact of a bomb released from the support and the position of the support at the time of impact of the bomb, means connectible with said power means for swinging said time of fall computing lever during the predetermined closing speed determining period at a uniform decelerating rate in advance of said sighting lever, initially greater and subsequently less than the rate of movement of said sighting lever, contact means between said sighting lever and time of fall computing lever for actuating said connectible means to connect the power means to said time of fall computing lever incident to initial contact between said levers to start the closing speed determining period, and bomb release means operable by said contact means incident to subsequent contact between said sighting lever and the time of fall computing lever at the termination of said closing speed determining period.

16. In a bomb sight for determining the dropping angle for the release of a bomb from an aircraft to strike a target, a support adapted to be advanced toward the target at a uniform closing speed and predetermined elevation, a vertically movable time of fall arm having a horizontally slotted portion, constant speed power means for moving said time of fall arm downwardly at a predetermined uniform rate, clutch means for initiating the operation of said power means, manual means for adjusting the position of said time of fall arm to an initial predetermined position, an adjustable trail angle lever pivoted to the support to swing in a vertical plane, having a longitudinally slotted portion disposed in overlapping parallel relation to said time of fall arm slotted portion, a sighting angle determining lever having a sighting axis and pivoted on said support, horizontally to the rear of the support with respect to said trail angle lever pivot, having a longitudinally extending forwardly inclined slotted portion disposed to swing in a plane parallel to the plane of movement of the slotted portions of the time of fall arm and the trail angle lever, means slidably interconnecting the slotted portions of said levers and said arm together, with the sighting axis passing through the axis of said interconnecting means and the pivotal axis of the sighting angle determining lever, whereby the dropping angle for the bomb is determined upon a second coincidence of the sighting axis with the target after the line of sight and sighting angle determining lever have been rotated from the initial sighting angle by engagement of said clutch means upon the first coincidence of the line of sight with the target at the said initial sighting angle, to the dropping angle as determined by the positions of said time of fall arm and trail angle lever which have been positioned at the dropping angle for the bomb at C×time of fall and trail angle of the bomb respectively, in which C is the constant downward vertical velocity of the time of fall arm when the clutch means is engaged, and means for adjusting the relative distance between the trail angle lever pivot and the sighting lever pivot to vary the angular relation of said initial sighting angle with respect to said bomb dropping angle.

17. In a bomb sight for determining the bomb dropping angle of a bomb from an aircraft in order to strike a selected target from a predetermined elevation and uniform closing speed between the target and the aircraft, a frame, a vertically disposed screw spindle rotatably carried by said frame, a nut threaded thereon, held against rotation, having a horizontal slotted time of fall arm projecting therefrom, manual means for rotatably adjusting said spindle to vertically adjust the nut and horizontal position of said slotted arm on the frame, constant speed power driving means for rotating said spindle to move the time of fall arm downwardly, clutch means for connecting the power means to said spindle to move said nut longitudinally along said spindle from said adjusted positions, a slotted trail angle lever pivoted to the frame having a slotted portion crossing the slotted portion of said time of fall arm, manual means for adjusting the angle of said trail angle lever for variations in trail angle between the aircraft and the bomb at the time of impact of the bomb, slidable connecting means located at the intersection of the slotted portions of said time of fall arm and said trail angle lever, a contact lever pivoted on said frame horizontally across from said trail angle lever pivot, toward the rear of the aircraft from the trail angle lever pivot, having a slotted extremity extending across the slotted portions of the trail angle lever and time of fall arm in slidable interlocking engagement with said slidable connecting means, electrical contact means on said contact lever, a sighting lever pivoted on said frame concentrically with respect to the pivot of said contact lever, said sighting lever having a bombing sight thereon and formed with a slotted free end portion, a horizontally threaded spindle rotatably journaled on said frame, a nut threaded thereon, held against rotation, having actuating means disposed in the slotted portion of the sighting lever, contact means on said sighting lever disposed for contacting engagement with said contact lever contact means, manual means for rotatably adjusting said horizontal spindle to adjust the sighting lever to dispose the line of sight on the selected target, regulatable power means for rotating said horizontal spindle to maintain the line of sight on the target during an approach toward the target at a uniform closing speed and predetermined elevation, to cause said sighting lever contact means to engage said contact lever contact means when said sighting lever sight reaches a predetermined initial sighting angle, determined by the initial setting of said contact lever, an energizing circuit for operating said clutch means, adapted to be closed by contacting engagement between said contact means to cause engagement of said clutch means to initiate the downward movement of said time of fall arm by said power means to subsequently dispose said contact lever contact in contacting relation with said sighting lever contact when said sighting lever moves the line of sight to a predetermined bomb dropping angle, determined by relative movement of said contact lever from its selected position by said time of fall arm and trail angle lever, and movement of said sighting lever by said regulatable power means in following the target, in which movement of said time of fall arm equals C×time of fall of the bomb, in which C is the constant vertical velocity of the time of fall arm after engagement of said clutch means at the initial selected sighting angle, bomb release means including an operating circuit therefor, and means for energizing said last mentioned circuit incident to said second contacting engagement between said sighting lever and contact lever contact means.

18. In a bomb sight, a support, an initial sighting angle and subsequent dropping angle determining lever pivoted to said support for swinging movement in a vertical plane, including downwardly and forwardly in the direction of movement of the aircraft carrying the sight, a trail angle setting lever pivotally disposed on said support in horizontally spaced relation to said initial sighting angle determining lever pivot to swing in a plane parallel to the plane of swing of said initial sighting angle determining lever, inclining downwardly and rearwardly across said initial sighting angle determining lever, means for fixedly adjusting the angle of said trail angle setting lever, a horizontally disposed time of fall arm movably disposed on said support for vertical movement, extending across said initial sighting angle determining and trail angle levers, means for slidably interconnecting said levers and said time of fall arm together, means for moving said time of fall arm uniformly downward at a predetermined rate from an initial sighting angle determining position to a subsequent predetermined dropping angle position, to move said sighting angle determining lever from said initial sighting angle position to said dropping angle position, clutch means for initiating the downward movement of said time of fall arm, and target sighting means cooperatively associated with said sighting angle determining lever for sighting a target at said initial sighting angle position and subsequently at said bomb dropping angle position, controlled by said sighting angle determining lever.

19. A bomb sight for determining the dropping angle of a bomb from an aircraft in order to strike a selected target from a predetermined elevation and during a uniform closing speed between the aircraft and the target, a frame, a vertical screw spindle rotatably carried by said frame, a nut threaded thereon and held against rotation, a vertically movable horizontally slotted time of fall arm operable by axial movement of said nut on said spindle, manual means for rotatably adjusting said spindle to adjust the vertical position of said horizontally slotted arm on said frame, constant speed power driving means for rotating said spindle, clutch means for connecting said power means to said spindle to rotate the same to move said nut longitudinally along said spindle from a predetermined adjusted position thereon, a trail angle lever pivoted to said frame and having a slotted portion extending across the horizontally slotted time of fall arm at the trail angle, manual means for adjusting the angular relation of said trail angle lever for variation in trail angles between the aircraft and the bomb at the time of impact of the bomb, a connecting pin located at the intersection of said slotted portion of the time of fall arm and said slotted portion of the trail angle lever, a sighting angle determining lever pivoted on said frame with its pivot disposed horizontally and parallel to the trail angle lever pivot, having a slotted extremity extending across the trail angle lever slotted portion and time of fall arm slotted portion in the plane of the sighting angle in slidable interlocking engagement with said connecting pin, said time of fall arm being movable parallel to a plane intersecting the axis of the trail angle lever pivot and sighting angle determining lever pivot, a target sight fixedly connected to said sighting angle determining lever with its sight axis extending in the same direction as a plane passing through the axis of said connecting pin and said sighting angle determining lever pivot when the target sight is in initial sighting angle position and parallel to the plane of swing of the sighting angle determining lever, said sighting angle determining lever being adjustable for predetermined airspeeds and elevations of the aircraft by predetermined angular adjustments respectively of the trail angle lever and vertical adjustments of said time of fall arm to dispose the sighting angle determining lever and the connected target sight in a predetermined initial sighting angle determining position for determining the initiation of the operation of said clutch means when the line of sight through the target sight and the selected target coincide, wherein the bomb dropping angle is determined upon the second coincidence of the line of sight with the target after the sighting angle determining lever has been moved from the initial sighting angle upon first coincidence of the line of sight with the selected target, to the bomb dropping angle as determined by the adjusted position of the time of fall arm and the position of the trail angle lever slotted portion which have been positioned at C×time of fall and trail angle of the bomb respectively during a closing speed determining period following initial coincidence of the line of sight with the target and simultaneous engagement of said clutch means, in which C is the constant vertical downward velocity of the time of fall arm following engagement of said clutch means while the power driving means is in operation, to cause the sighting angle determining lever and sight to be moved at a uniformly decelerating rate during a closing speed determining period, initially greater than the relative movement of the target with respect to the line of sight thereon to dispose the line of sight at bomb dropping position when the line of sight again coincides with the target.

OSCAR BOONSHOFT.

REFERENCES CITED

The following references are of record in the file of this patent:

UNITED STATES PATENTS

| Number | Name | Date |
|---|---|---|
| 1,968,127 | Clementi | July 31, 1934 |
| 2,105,147 | Inglis | Jan. 11, 1938 |
| 2,431,919 | Clark | Dec. 2, 1947 |

FOREIGN PATENTS

| Number | Country | Date |
|---|---|---|
| 610,440 | Germany | Mar. 16, 1935 |